United States Patent
Jasapara (10) Patent No.: US 8,218,928 B2
(45) Date of Patent: Jul. 10, 2012

(54) SPATIAL FILTERING OF HIGHER ORDER MODES IN MULTIMODE FIBERS

(75) Inventor: Jayesh C. Jasapara, North Plainfield, NJ (US)

(73) Assignee: OFS Fitel, LLC, Norcross, GA (US)

( * ) Notice: Subject to any disclaimer, the term of this patent is extended or adjusted under 35 U.S.C. 154(b) by 489 days.

(21) Appl. No.: 12/386,934

(22) Filed: Apr. 23, 2009

(65) Prior Publication Data

US 2010/0271689 A1    Oct. 28, 2010

(51) Int. Cl.
*G02B 6/028* (2006.01)
*H04B 10/17* (2006.01)

(52) U.S. Cl. .................... 385/124; 359/341.1

(58) Field of Classification Search .............. 359/341.1; 385/124

See application file for complete search history.

(56) References Cited

U.S. PATENT DOCUMENTS

| | | | |
|---|---|---|---|
| 4,701,011 A | 10/1987 | Emkey et al. | |
| 5,003,623 A | 3/1991 | Asawa | |
| 5,818,630 A * | 10/1998 | Fermann et al. | 359/341.31 |
| 6,249,626 B1 * | 6/2001 | Bergmann | 385/48 |
| 6,278,816 B1 | 8/2001 | Keur et al. | |
| 6,542,665 B2 | 4/2003 | Reed et al. | |
| 6,552,298 B1 | 4/2003 | Wagner | |
| 6,717,721 B2 * | 4/2004 | Kent et al. | 359/341.5 |
| 6,856,737 B1 | 2/2005 | Parker et al. | |
| 6,915,053 B2 | 7/2005 | Hasegawa | |
| 6,922,503 B2 | 7/2005 | Hasegawa | |
| 6,970,624 B2 | 11/2005 | DiGiovanni et al. | |
| 6,990,270 B2 | 1/2006 | Nicholson | |
| 7,076,174 B2 | 7/2006 | Watanabe et al. | |
| 7,257,293 B1 | 8/2007 | Fini et al. | |
| 7,306,376 B2 | 12/2007 | Scerbak et al. | |
| 7,308,171 B2 * | 12/2007 | Booth et al. | 385/34 |
| 7,321,708 B2 * | 1/2008 | Jenkins et al. | 385/52 |
| 7,340,138 B1 * | 3/2008 | Yablon et al. | 385/124 |
| 7,400,807 B2 | 7/2008 | Minelly et al. | |

(Continued)

FOREIGN PATENT DOCUMENTS

EP    0 316 191    5/1985

(Continued)

OTHER PUBLICATIONS

Emkey et al, "Analysis and Evaluation of Graded-Index Fiber-Lenses", Journal of Lightwave Technology, vol. LT-5, No. 9, Sep. 1987.

*Primary Examiner* — Eric Bolda
(74) *Attorney, Agent, or Firm* — Wendy W. Koba, Esq.

(57) ABSTRACT

A mode filter for eliminating the propagation of higher-order modes along a section of optical multimode fiber comprises a graded index (GRIN) lens, preferably of a quarter-pitch length, and a pinhole element in the form of a small core fiber. This configuration creates a Fourier spatial filter assembly that removes higher order modes propagating along an optical fiber while capturing the fundamental mode of the optical signal. A section of GRIN fiber is preferably used as the lens, with the small core fiber disposed at the output of the GRIN fiber lens to collect substantially only the on-axis fundamental mode of the optical signal. Since the higher order modes are shifted away from the origin by the GRIN fiber lens, only the fundamental mode signal is captured by the small core fiber.

20 Claims, 5 Drawing Sheets

U.S. PATENT DOCUMENTS

| | | |
|---|---|---|
| 7,430,224 B2 | 9/2008 | Liu et al. |
| 7,430,226 B2 | 9/2008 | Liu |
| 7,433,558 B2 | 10/2008 | Booth et al. |
| 7,437,046 B2 | 10/2008 | DiGiovanni et al. |
| 7,457,500 B2 | 11/2008 | Windeler et al. |
| 2002/0150333 A1* | 10/2002 | Reed et al. ............... 385/34 |
| 2005/0265653 A1* | 12/2005 | Cai et al. ............... 385/28 |
| 2007/0081764 A1 | 4/2007 | Deliwala |
| 2007/0140634 A1* | 6/2007 | Windeler et al. ............... 385/123 |
| 2007/0206910 A1 | 9/2007 | Ramachandran |
| 2007/0230884 A1 | 10/2007 | Minelly et al. |
| 2008/0180787 A1* | 7/2008 | DiGiovanni et al. ......... 359/334 |
| 2010/0189393 A1* | 7/2010 | Noguchi et al. ............... 385/34 |

FOREIGN PATENT DOCUMENTS

| | | |
|---|---|---|
| EP | 2113798 A1 * | 11/2009 |
| WO | WO 88/09944 | 12/1988 |

* cited by examiner

SPATIAL FILTERING OF HIGHER ORDER MODES IN MULTIMODE FIBERS

TECHNICAL FIELD

The present invention relates to a mode filter for removing higher order mode signals propagating along a multimode fiber and, more particularly, to the use of the Fourier transform property of a graded index (GRIN) lens, in combination with a pinhole element, to block further propagation of higher order modes.

BACKGROUND OF THE INVENTION

Large mode area (LMA) fibers are widely used in the fabrication of optical fiber-based elements such as high power lasers and amplifiers. The increase in mode area with respect to conventional fibers offer several benefits, such as reduced signal impairment (associated with nonlinearities), increased overlap of a pump signal with the gain medium in an amplifier, and increased energy storage capacity. However, increasing the mode area of these fibers results in them becoming "multi-moded", where multiple spatial modes can be excited through discrete or distributed scattering events along the length of the fiber. These multiple spatial modes interfere with the fundamental signal mode, altering the center of mass position of the beam and increasing the minimum focused spot size ($M^2$). It is therefore desirable to remove the higher order spatial modes present within fiber systems formed of LMA fiber.

Much of the current research in high power fiber lasers is devoted to engineering complex LMA fiber configurations so that they effectively support only the fundamental mode. The index profile and/or dopant profile of LMA fiber is designed so that the fiber exhibits differential gain for the fundamental mode or, alternatively, differential loss for the higher order modes. Coiling and/or tapering LMA fibers have previously been used to strip away higher order modes. However, tight bending of LMA fiber shifts the mode away from the fiber axis and reduces the mode area, while increasing nonlinearity. The bending also impacts the degree of overlap between the signal and the doped core region of the fiber, thereby reducing gain. Fiber taper lengths are relatively long (e.g., a few centimeters) which results in increased nonlinearity arising from propagation in a small mode area, and the tapered fiber section is fragile and requires special packaging.

SUMMARY OF THE INVENTION

The needs remaining in the prior art are addressed by the present invention, which relates to a mode filter for removing higher order mode signals propagating along a multimode fiber, such as a "large mode area"—LMA—fiber and, more particularly, to the use of the Fourier transform property of a GRIN lens, in combination with a pinhole element, to block the further propagation of higher order modes.

The GRIN lens may be fiber-based or a bulk optic component. The pinhole element preferably comprises a small core fiber coupled to the output of the GRIN lens to collect only that portion of the optical signal propagating along the optical axis. Since the GRIN lens shifts the higher order modes away from the optical axis, only the fundamental mode of the optical signal will be coupled into the small core fiber. In a preferred embodiment of the inventive spatial mode filter, a fiber-based GRIN lens is used in combination with a small core fiber, thus forming an "in-fiber" mode filter that may be fused to an endface termination of the multimode (LMA) fiber. While this is the preferred embodiment, a bulk optic arrangement using a bulk GRIN lens may also be used to achieve the same mode stripping results.

In one embodiment, the mode filter of the present invention is disposed at the output of a section of LMA fiber used as a gain medium for a fiber amplifier so as to remove unwanted higher order modes from the amplified signal.

Another embodiment of the present invention includes a plurality of mode filters distributed in series along a multimode transmission fiber for periodic "cleaning" of an optical signal propagating along the multimode fiber. The deployment of multiple spatial mode filters along a multimode fiber-based communication system functions to periodically remove unwanted higher order mode signals generated during signal propagation along a length of multimode fiber.

One advantage of an in-fiber embodiment of the present invention is low levels of fundamental mode loss. In a preferred embodiment of the present invention, a GRIN fiber lens is directly fused to the output of the multimode signal fiber (e.g., LMA fiber). When used in conjunction with a fiber amplifier, various other amplifier elements may also be fiber-based (e.g., reflectors, mode converters, and the like) and directly coupled to the inventive mode filter, further reducing levels of insertion loss within the optical system.

Other and further aspects and embodiments of the present invention will become apparent during the course of the following discussion and by reference to the accompanying drawings.

BRIEF DESCRIPTION OF THE DRAWINGS

Referring now to the drawings.

DETAILED DESCRIPTION

The lensing properties of graded index (GRIN) optical elements are well-known in the art. Generally speaking, GRIN optical elements have a radial refractive index distribution as defined by the following relation:

$$n(r) = n_0 \sqrt{1 - g^2 r^2},$$

where $n_0$ is defined as the refractive index along the central axis of the optical element, g is defined as the focusing parameter, and r is the radial coordinate defining the dimension of the optical element. It has been shown that on propagation over a length $L = \pi/(2g)$ (defined as a "quarter pitch" length) of a GRIN optical element, the eigen-modes of the GRIN medium are Fourier transformed. Thus, any electric field incident on a GRIN optical element will be Fourier transformed on propagating a quarter pitch length L through the element.

A Gaussian beam with waist $w_1$ (which is not an eigen mode of the GRIN element) is Fourier transformed into another Gaussian beam of waist $w_2$ on propagation through a GRIN element of quarter pitch length. Propagation through a second quarter pith GRIN element converts the beam waist back to $w_1$. These periodically occurring beam waists are related by the expression:

$$w_1 w_2 = \frac{\lambda}{\pi n g}.$$

In the past, this property of GRIN elements has been used to achieve mode-matched coupling between fibers with different mode areas. In the context of high power LMA fiber laser systems, for example, GRIN lenses have been used to selectively couple light from a small core single mode fiber into the fundamental mode of an LMA fiber for subsequent amplification.

In accordance with the present invention, the Fourier transforming property of GRIN lenses is presently used to implement Fourier space filtering, separating the higher order modes from the desired fundamental mode of a signal propagating along a multimode fiber. The spatial mode filter of the present invention may be coupled to, for example, an endface of an LMA fiber amplifier to prevent further amplification of higher order modes or several filters of the present invention may be periodically disposed along a length of multimode transmission fiber to remove any higher order modes that may appear in a propagating communication signal.

Figure 1:
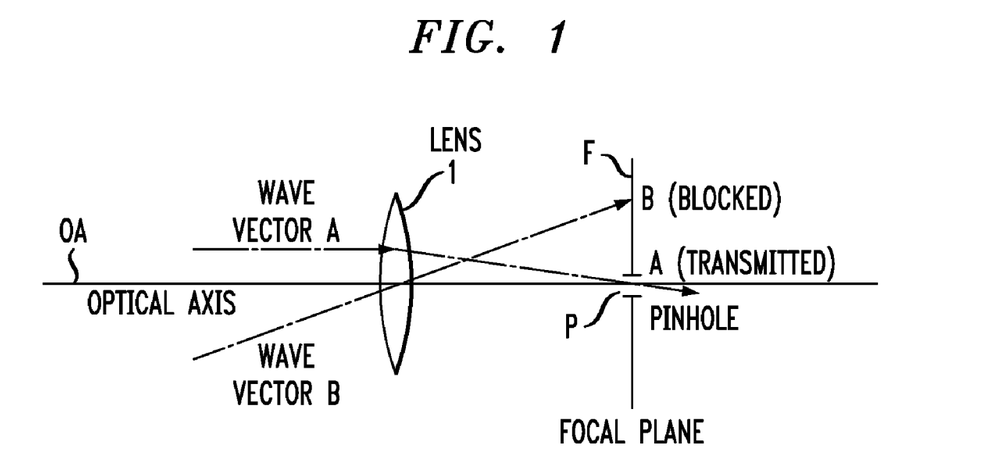
FIG. 1 is a diagram showing the basic concepts of Fourier spatial mode filtering.

FIG. 1 illustrates the basic concept of using Fourier spatial filtering to strip away the higher order modes from a propagating signal. Light rays incident on a lens 1 with wave vectors at various angles are focused to specific points in the focal plane F of lens 1, these points being related to the angle of the associated wave vector relative to the optical axis OA of lens 1. As shown, rays with wave vectors parallel to the optical axis such as wave vector A in FIG. 1 focus to a spot on optical axis OA in the focal plane F. Rays with wave vector components non-parallel to optical axis OA such as wave vector B in FIG. 1 focus away from optical axis OA in the focal plane F. The shift away from the optical axis in the focal plane is larger for waves with a large transverse component of the wavevector. By placing a pinhole P in focal plane F, the desired wave vector can be chosen for transmission. For example, by placing pinhole P on optical axis OA, wave vector A propagating parallel to optical axis OA will be transmitted while filtering out all other wave vectors (such as wave vector B).

The fundamental mode of an optical signal propagating through a fiber is known to exhibit the smallest transverse wave vector component, whereas higher order modes have larger transverse wave vector components. Therefore, when the modes from multimode fiber are focused by a lens, the fundamental mode lies in a small area approximately centered on the optical axis in the focal plane, whereas the higher order modes are focused further away from the optical axis. A pinhole placed on the optical axis in the focal plane will therefore transmit only the fundamental mode and eliminate the higher order modes in the transmitted beam.

Figure 2:
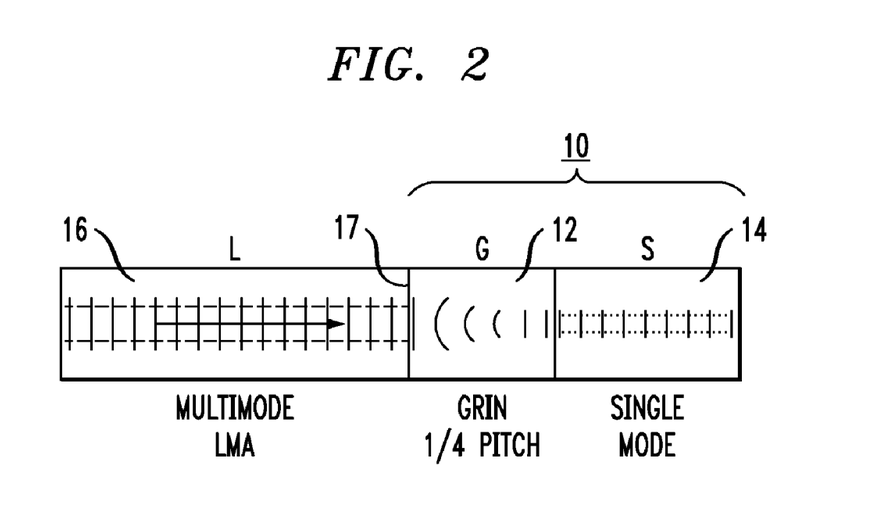
FIG. 2 illustrates an exemplary mode filter formed in accordance with the present invention.

FIG. 2 illustrates an exemplary spatial mode filter 10 formed in accordance with an embodiment of the present invention. In this embodiment, mode filter 10 comprises a section of GRIN fiber 12 coupled to a section of small core fiber 14. GRIN fiber 12 functions as a lens and performs the necessary Fourier space filtering while small core fiber 14 provides the pinhole aperture required to block the spatially separated higher order modes and permit transmission of only the fundamental mode. Mode filter 10 is used in conjunction with a section of multimode fiber 16 and is preferably directly fused to an endface 17 of multimode fiber 16. Multimode fiber 16 may comprise a standard multimode fiber or, alternatively, a large mode area (LMA) fiber. For the sake of convenience, fiber 16 will hereinafter be referred to as "LMA fiber", with the understanding that this description also includes "multimode fiber". For the reasons discussed above, there are many applications where continued propagation of the higher order modes is undesirable. In accordance with the present invention, mode filter 10 functions to direct these higher order modes away from the signal path using Fourier spatial filtering as outlined in the diagram of FIG. 1.

Referring to FIG. 2, LMA fiber 16 has a fundamental mode approximated by a Gaussian beam of waist $w_1$, whereas small core fiber 14 has a Gaussian waist of $w_2$. With reference to the equations outlined above, the length of GRIN fiber lens 12 is selected so that its focusing parameter g satisfies the beam waist mode conversion from $w_1$ to $w_2$. This ensures that the loss for coupling the fundamental mode into small core fiber 14 is minimized. As shown diagrammatically in FIG. 2, the light launched from LMA fiber 16 is Fourier transformed while propagating through quarter-pitch length GRIN fiber lens 12. Although the embodiment depicted in FIG. 2 describes a spatial mode filter with a "quarter-pitch" length of GRIN fiber, one of ordinary skill will recognize that the scope of the present invention encompasses spatial mode filters utilizing various lengths of GRIN fiber, depending on the Fourier transforming properties desired. In general, the Fourier transforming element may take the form of any suitable optical component—for example, a "bulk" (discrete) optical component or a fiber-based optical component. In most embodiments, a fiber-based component is preferred for its low levels of coupling loss.

Whereas the fundamental $LP_{01}$ mode is thereafter coupled with low loss into small core fiber 14, the energy of the higher order modes is displaced away from the fiber axis and, as a result, suffers high coupling loss. Small core fiber 14 functions as a "pinhole" wave vector filter and transmits only the lowest spatial frequencies.

Simulations have been performed which confirm the Fourier transforming properties of a GRIN lens as used in the spatial filter of the present invention. Combining these results with the known overlap of the electric field intensity at the output of the GRIN lens with the fundamental mode of the associated small core single mode fiber, the properties of the mode filtering and coupling loss can be calculated.

Figure 3:
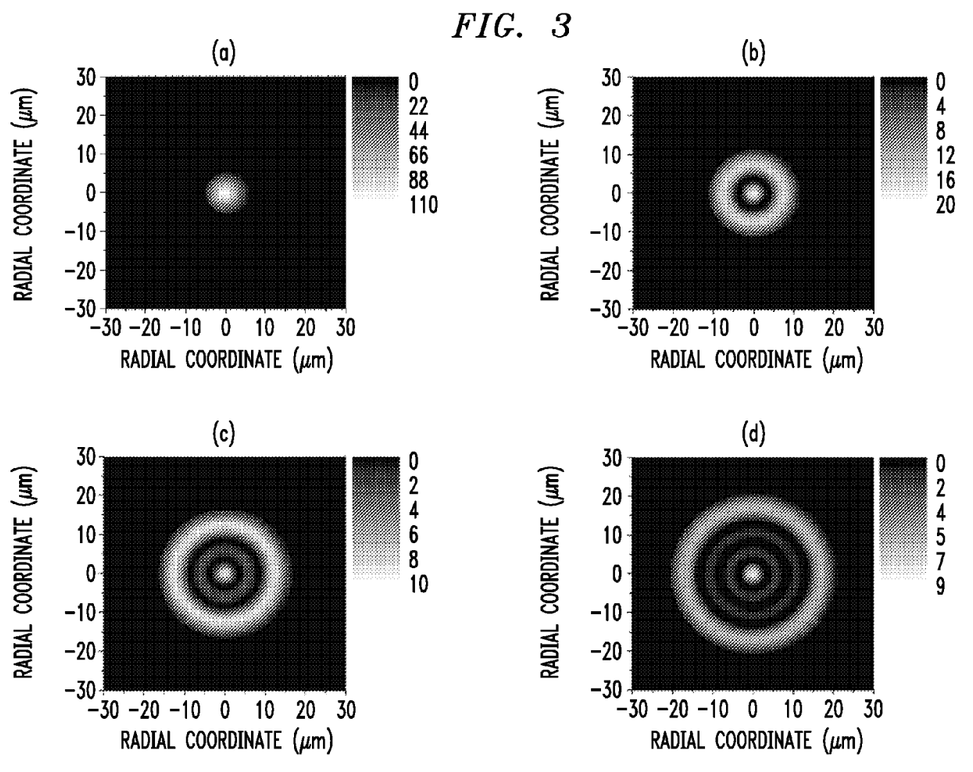
FIG. 3 is a set of simulated electric field intensities illustrate the Fourier transforming properties of a GRIN optical lens, FIG. 3(a) associated with the fundamental $LP_{01}$ mode and FIGS. 3(b)-(d) associated with higher order $LP_{0x}$ modes.

FIG. 3 illustrates the distribution of the electric field intensities of the various $LP_{0m}$ modes (m=1, 2, 3, 4) at the output plane (i.e., the "focal plane") of the GRIN lens in the spatial filter arrangement of the present invention. As discussed above, these modes are Fourier transformed on their propagation through the GRIN lens. As expected, the fundamental $LP_{01}$ mode shown in FIG. 3(a) retains a Gaussian distribution centered on the optical axis. In contrast, the electric field intensity of the higher order modes become distributed, with a majority of the energy in each mode found in rings surrounding the optical axis—the size of the rings increasing with increasing mode order. FIG. 3(b) illustrates the intensity distribution for the $LP_{02}$ mode, FIG. 3(c) for the $LP_{03}$ mode and FIG. 3(d) for the $LP_{04}$ mode.

Figure 4:
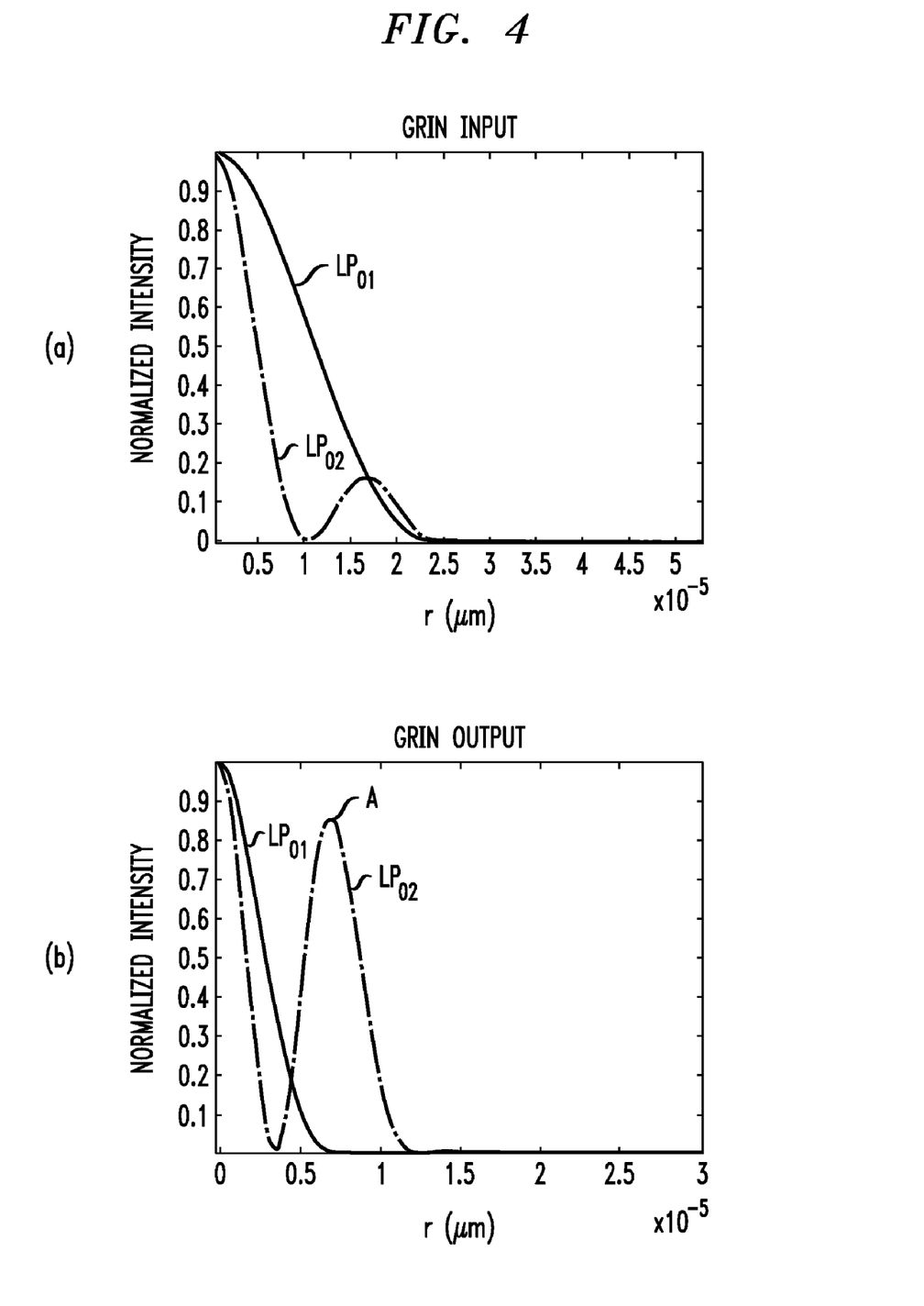
FIG. 4 illustrates the change in field intensity for the fundamental $LP_{01}$ mode and the higher order $LP_{02}$ mode, showing the intensity profiles at the input of a GRIN optical lens (FIG. 4(a)) and the output of the GRIN optical lens (FIG. 4(b))

FIG. 4 illustrates a normalized electric field intensity for the fundamental $LP_{01}$ mode and the next-highest $LP_{02}$ mode at both the input and output of an exemplary quarter pitch GRIN lens. The graphs in FIG. 4(a) are plots of the electric field intensities at the input to the GRIN lens—illustrating the overlap in modal energies which is present as the signal propagates along an LMA fiber. The Fourier transforming properties of the GRIN lens are evident in the plots of FIG. 4(b), where essentially all of the energy associated with the fundamental mode is now concentrated within the central optical axis region of the GRIN lens. The Fourier transform of the $LP_{02}$ mode results in creating a peak (shown as "A" in FIG. 4(b)) at a location which is spatially separated from the optical axis, with a majority of the energy of this mode residing within this peak area. This distribution confirms the diagram of FIG. 3(b), also associated with the $LP_{02}$ mode.

Figure 5:
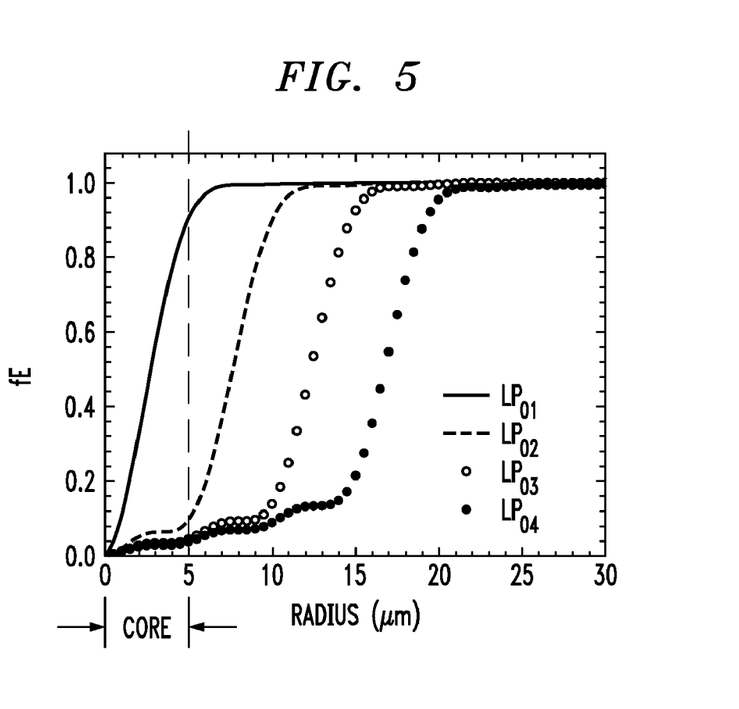
FIG. 5 is a plot of the fraction of mode energy contained within a given radius as a function of the radial coordinate for the fundamental mode and a number of higher order modes.
Figure 6:
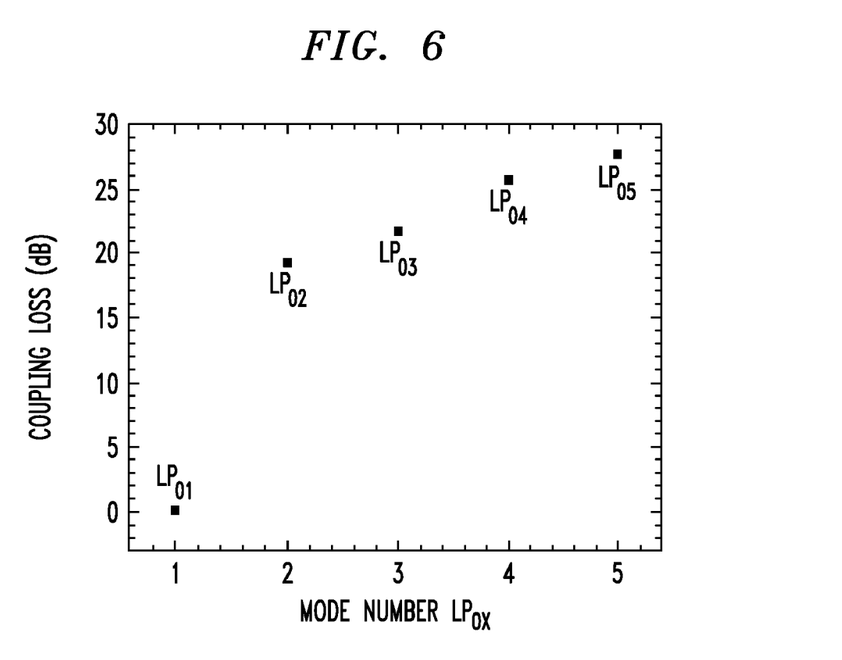
FIG. 6 shows the calculated coupling loss (in dB) between the various modes of the LMA fiber and the fundamental mode of the small core single mode fiber.

The data plotted in FIG. 5 further confirms the electric field intensity results depicted in FIG. 3, where FIG. 5 is a plot of the fraction of mode energy contained within a given radius as a function of the radial coordinate. As shown, the Fourier-transformed higher order modes exhibit very little overlap with the core region of the small core single mode fiber. FIG. 6 shows the calculated coupling loss (in dB) between the various modes of the LMA fiber and the fundamental mode of the small core single mode fiber. As shown, the fundamental $LP_{01}$ mode of the LMA fiber is coupled to the small core single mode fiber with very low loss (approximately 0.15 dB), whereas all higher order modes $LP_{0m}$ suffer losses exceeding 15 dB. (Note that $LP_{nm}$ modes, where n is non zero, such as the $LP_{12}$, have zero coupling to the fundamental mode in an axis-symmetric geometry because of symmetry considerations).

Many applications exist which require the use of LMA fibers to limit nonlinear signal distortions. Whereas in the prior art a GRIN fiber lens has been used to couple a single mode signal propagating along a small core fiber into a large area fiber in an adiabatic, mode-conserving scheme, the device of the present invention is used to treat a multimode signal propagating along an LMA fiber. The pinhole element, in conjunction with the GRIN fiber lens, functions to provide the desired spatial mode filtering. In order to prevent nonlinear signal distortion in a small core fiber used as the pinhole element, it is desirable to limit its length as much as possible. Indeed, the maximum length $L_1$ of this fiber should be limited to less than or equal to:

$$(w_1/w_2)^2 L_2,$$

where $L_2$ is the length of the LMA fiber preceding the GRIN lens, and $w_1$ and $w_2$ are the beam waists as defined above. This limitation on the small core fiber length ensures that the nonlinearity experienced in the small core fiber will be no greater than that experienced in the preceding section of LMA fiber.

Upon being prevented from further propagation along the signal path of the small core fiber, the higher-order mode signals present at the termination of the GRIN fiber lens will thereafter propagating as cladding modes of the small core fiber. Thus, the limit on the length of the small core fiber is also defined by a consideration of the minimum length required to strip away these cladding modes so that they do not appear at the termination of the small core fiber. Obviously, this length will depend upon various parameters of each of the system components. Indeed, the stripping of the cladding modes of the small core fiber could be enhanced by specific fiber design, or by applying high-index gels or polymers to the fiber surface. These and other techniques may be used in conjunction with the arrangement of the present invention to reduce the length of the small core fiber being used as the pinhole element.

Moreover, it is known that core imperfections may allow for a fundamental mode propagating along an LMA fiber to differ substantially from the ideal Gaussian shape. It is known from the prior art that the utilization of a GRIN lens will perform beam shaping so as to convert a non-Gaussian beam into the preferred Gaussian form, where this specific type of GRIN lens takes on a more complex configuration, including non-parabolic radial refractive index profiles. It is to be understood that these more complex GRIN lenses may be used in implementations of the present invention where non-Gaussian signal conditions are present.

As mentioned above, the spatial mode filter of the present invention is particularly well-suited for use in fiber laser and amplifier systems employing LMA fibers. An advantage of implementing the spatial mode filter of the present inventions is that it prevents energy stored in the lasing medium from being drained away by the higher order modes which would otherwise continue to propagate within the medium.

Figure 7:
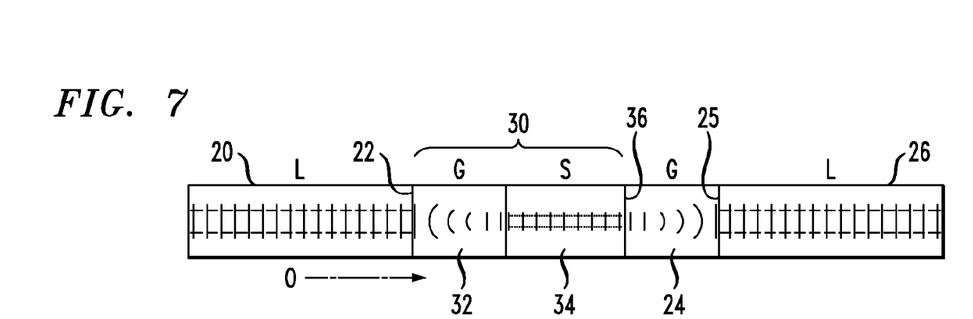
FIG. 7 illustrates another embodiment of the present invention, in this case utilizing a GRIN mode converter at the output of the spatial mode filter to re-covert the beam waist from the small core single mode fiber to the larger waist associated with a second section of LMA fiber.

Another embodiment of the present invention, illustrated in FIG. 7, depicts an exemplary arrangement for using a spatial mode filter within a fiber amplifier system. It is to be understood that only a portion of a complete fiber amplifier is illustrated. Referring to FIG. 7, a first section of LMA fiber 20 provides amplification to a propagating optical signal O. LMA fiber 20 includes a rare earth dopant (such as, for example, erbium or ytterbium) for amplifying the propagating optical signal. A spatial mode filter 30, similar to spatial mode filter 10 of FIG. 2, is coupled to an endface 22 of first LMA fiber section 20. Mode filter 30 includes a GRIN lens 32 (in this example comprising a section of optical fiber and hereinafter referred to as "GRIN fiber lens 32") followed by a small core fiber 34 (used as the pinhole element in the inventive spatial filter). As with the above-described embodiment, GRIN fiber lens 32 functions to Fourier transform the propagating optical signal and spatially shift the propagating higher order modes away from the fiber axis so that they are thereafter blocked from entering small core fiber 34.

In order to propagate the amplified, filtered signal into a connecting second section of LMA fiber 26, a second GRIN fiber lens 24 is coupled to an output endface 36 of small core fiber 34, thereby preserving the preferred all-fiber configuration. In this example, GRIN fiber lens 24 functions as a mode converter to increase the spot size of the fundamental mode output by small core fiber 34 in order to match the fundamental mode of second section of LMA fiber 26 (that is, convert the beam waist from $w_2$ back to the original mode size of $w_1$). The second section of LMA fiber 26 can be directly coupled to an endface 25 of second GRIN fiber lens 24.

In yet another embodiment of the present invention, the arrangement of FIG. 7 may be repeated along multiple sections of multimode fiber, such as a transmission fiber system, where a second GRIN lens is appended to the output of the each spatial mode filter section to provide mode matching. Indeed, repetitive arrangements of a first GRIN lens/small core fiber/second GRIN lens can be disposed at disparate locations along a multimode transmission fiber to periodically filter out the unwanted higher order modes of the propagating optical signal.

Figure 8:
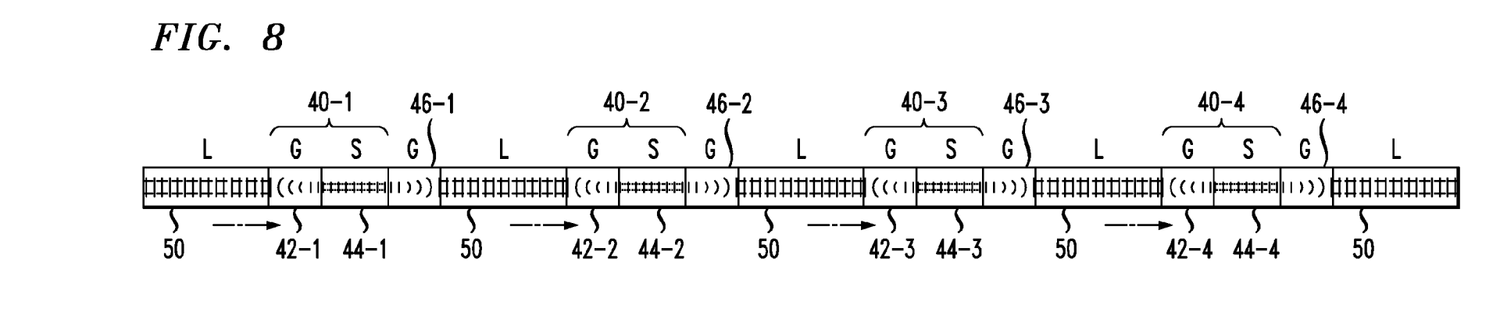
FIG. 8 shows an exemplary optical fiber communication system using spatial mode filtering in accordance with the present invention, showing a series of four separate spatial mode filters disposed along the communication fiber in a spaced-apart arrangement.

One such arrangement using multiple spatial mode filters is illustrated in FIG. 8. As shown, an arrangement of a plurality of spatial mode filters 40-1, 40-2, 40-3 and 40-4, formed in accordance with the present invention, are disposed between sections of multimode fiber 50, each mode filter comprising a first GRIN lens 42-*i* (i=1, 2, 3, 4) and a small core fiber 44-*i* (i=1, 2, 3, 4). A mode converter 46-*i* (i=1, 2, 3, 4), preferably a second GRIN lens, is used in conjunction with each spatial mode filter to match the mode of the filtered output signal from the small core single mode fiber to the mode of the following section of multimode fiber 50.

Figure 9:
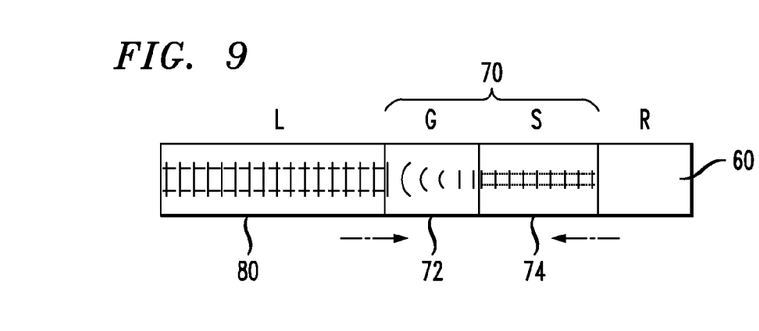
FIG. 9 illustrates another embodiment of the present invention, well-suited for use in a fiber-based amplifier or laser configuration, incorporating a wavelength selective reflecting element disposed at the output of the spatial mode filter.

FIG. 9 presents another embodiment of the inventive spatial mode filter, particularly well-suited for use in a fiber laser/amplifier system. In this case, a reflecting element 60 is coupled to the output of a spatial mode filter 70, spatial mode filter 70 including a GRIN fiber lens 72 and small core single mode fiber 74 as described above. A section of LMA fiber 80, incorporating rare-earth dopants to provide amplification to a propagating optical signal, is coupled to the input of spatial mode filter 70. Reflecting element 60 can take the form of, for example, a grating structure written into an optical fiber with the period of the grating selected to reflect the wavelength of the propagating, amplified signal.

Upon reaching reflective element 60, the fundamental mode signal reverses in direction and passes again through small core single mode fiber 74 and GRIN fiber lens 72 (as indicated by the arrows in FIG. 8) to re-enter LMA fiber 80. By virtue of the reciprocal nature of the mode converting properties of GRIN fiber lens 72, a spot size of the reflected signal is enlarged to substantially match the mode size of LMA fiber 80. The reflected, large mode area signal is shown by the dotted line in FIG. 9.

Although the present invention has been described in terms of the presently preferred embodiments, it is to be understood that such disclosure is not to be interpreted as limited. Various alterations and modifications will no doubt become apparent to those skilled in the art after reading the above disclosure. Accordingly, it is intended that the appended claims be interpreted as covering all such variations as fall within the true spirit and scope of the invention.

What is claimed is:

1. An optical spatial mode filter for use with multimode input signals including a fundamental mode and at least one higher order mode, the spatial mode filter comprising:
   a graded index (GRIN) optical lens including an input and an output for receiving at the input a multimode input signal and exhibiting a radial refractive index profile for spatially separating the at least one higher order mode from the fundamental mode of an optical signal propagating along the optical axis thereof, wherein the GRIN optical lens comprises a quarter-pitch length L defined as $L=\pi/(2g)$, where g is a focusing parameter of the GRIN optical lens; and
   a pinhole element coupled to the output of the GRIN optical lens, the pinhole element comprising a section of small core optical fiber of a predetermined length, the small core defined as an aperture of the pinhole element, with the aperture disposed to align with the optical axis and the predetermined length of the small core optical fiber selected to permit further propagation of substantially only the fundamental mode of the multimode input signal along the optical axis.

2. An optical spatial mode filter as defined in claim 1, the filter further comprising
   a second GRIN optical lens coupled to the output of the pinhole element for increasing a mode area of the propagating fundamental mode optical signal exiting the pinhole element.

3. An optical spatial mode filter as defined in claim 1 wherein the pinhole element is configured to support the fundamental mode with a first mode radius $w_1$ and an input multimode signal includes a fundamental mode with a second mode radius $w_2$ and, wherein the first and second mode radii are related by the following expression:

$$w_1 w_2 = \frac{\lambda}{\pi n g}$$

wherein $\lambda$ is a wavelength of the propagating optical signal, n is a refractive index of the GRIN optical lens, and g is a focusing parameter of the GRIN optical lens.

4. An optical spatial mode filter as defined in claim 1, wherein the focusing parameter g is associated with a radial distribution of the refractive index n of said GRIN optical lens as follows:

$$n(r) = n_0 \sqrt{1 - g^2 r^2}$$

wherein $n_0$ is associated with the refractive index along the central optical axis, and r is associated with the radial coordinate of the GRIN optical lens.

5. An optical spatial mode filter as defined in claim 1 wherein the GRIN optical lens comprises a bulk optic component.

6. An optical spatial mode filter as defined in claim 1 wherein the GRIN optical lens comprises a fiber-based component.

7. An optical spatial mode filter as defined in claim 6 wherein the input endface of the fiber-based GRIN optical lens is directly fused to an endface of the input multimode fiber.

8. An optical spatial mode filter as defined in claim 1 wherein the small core fiber comprises a single mode fiber.

9. An optical spatial mode filter as defined in claim 8 wherein the small core single mode fiber has a maximum predetermined length $L_1$ equal to $(w_1/w_2)^2 L_2$, where $L_2$ is a length of an input multimode fiber coupled to the input of the GRIN optical lens, $w_1$ is a beamwaist of a multimode signal at the input of the GRIN optical lens and $w_2$ is a beamwaist of a fundamental mode of an optical signal at the output of the GRIN optical lens.

10. An optical spatial mode filter as defined in claim 8 wherein the GRIN optical lens comprises a fiber-based component and the pinhole element small core single mode fiber is directly fused to an output endface of the fiber-based GRIN optical lens.

11. An optical spatial mode filter as defined in claim 1 further comprising a large mode area fiber as an input fiber for supporting the propagation of an input multimode optical signal.

12. An optical spatial mode filter for use with multimode input signals including a fundamental mode and at least one higher order mode, the spatial mode filter comprising:
   a graded index (GRIN) optical lens including an input and an output for receiving at the input a multimode input signal and exhibiting a radial refractive index profile for spatially separating the at least one higher order mode from the fundamental mode of an optical signal propagating along the optical axis thereof, wherein the GRIN optical lens comprises a refractive index profile for converting a non-Gaussian fundamental mode into a Gaussian output fundamental mode propagating optical signal; and a pinhole element coupled to the output of the GRIN optical lens the pinhole element comprising a section of small core optical fiber of a predetermined length, the small core defined as an aperture of the pinhole element, with the aperture disposed to align with the optical axis and the predetermined length of the small core optical fiber selected to permit further propagation of substantially only the fundamental mode of the multimode input signal along the optical axis.

13. A fiber-based optical amplifier/laser utilizing a section of rare-earth doped large mode area (LMA) fiber as an amplifying medium, the amplifier further including a spatial mode filter coupled to an endface of the LMA fiber for preventing further propagation of at least one higher-order mode, the spatial mode filter comprising:

a graded index (GRIN) optical lens exhibiting a radial refractive index profile for spatially separating at least one higher order mode from a fundamental mode of an optical signal propagating therethrough, the GRIN optical lens coupled to an output of the LMA amplifying fiber; and a pinhole element coupled to the GRIN optical lens, the pinhole element comprising a section of small core optical fiber of a predetermined length, the small core defined as an aperture of the pinhole element, with the aperture disposed to align with the optical axis and the predetermined length of the small core optical fiber selected to permit further propagation of substantially only the fundamental mode of the amplified optical signal along the optical axis.

14. A fiber-based optical amplifier/laser as defined in claim 13, wherein the amplifier/laser further comprises a second GRIN optical lens coupled to the output of the pinhole element of the spatial mode filter for increasing a mode area of the propagating fundamental mode amplified optical signal exiting the pinhole element.

15. A fiber-based optical amplifier/laser as defined in claim 13, wherein the GRIN optical lens comprises a fiber-based component directly fused to the section of LMA fiber.

16. A fiber-based optical amplifier/laser as defined in claim 13, wherein the section of small core fiber is directly fused to an output of the GRIN optical lens.

17. A fiber-based optical amplifier/laser as defined in claim 13, the amplifier/laser further comprising an optical reflecting element disposed within an output portion of the pinhole element for re-directing the amplified fundamental mode of the propagating optical signal back through the GRIN optical lens and into the section of rare-earth doped LMA fiber.

18. An optical transmission system utilizing a multimode optical communication fiber, the transmission system further comprising at least one spatial mode filter disposed along the multimode optical communication fiber to strip away higher order modes from an optical communication signal propagating along an optical axis, the at least one spatial mode filter comprising:

a graded index (GRIN) optical lens including an input and an output, the GRIN optical lens for receiving at the input a multimode signal including a fundamental mode and at least one higher-order mode, the GRIN optical lens exhibiting a radial refractive index profile for spatially separating the at least one higher order mode from the fundamental mode propagating therealong, wherein the GRIN optical lens comprises a quarter-pitch length L defined as $L=\pi/(2g)$, where g is a focusing parameter of the GRIN optical lens; and a pinhole element coupled to the output of the GRIN optical lens, the pinhole element comprising a section of small core optical fiber of a predetermined length, the small core defined as an aperture of the pinhole element, with the aperture disposed to align with the optical axis and the length of the small core optical fiber selected to permit further propagation of substantially only the fundamental mode of the optical signal along the optical axis.

19. An optical transmission system as defined in claim 18, wherein the at least one spatial mode filter comprises a plurality of spatial mode filters, each spatial mode filter disposed in a separate location along the multimode optical communication fiber so as to periodically spatially filter any higher-order modes from the optical signal propagating therealong.

20. A method of removing higher order modes from an optical signal propagating along a large mode area fiber, the method including the steps of:

a) applying a multimode optical signal as an input to a GRIN optical lens for spatially separating higher order modes from a fundamental mode propagating along an optical axis; and b) aligning a core region of a small core optical fiber as an aperture with the optical axis at the output of the GRIN optical lens, the small core optical fiber having a predetermined length selected such that substantially only the fundamental mode of the optical signal will continue to propagate along the optical axis.

\* \* \* \* \*